(12) United States Patent
Han

(10) Patent No.: US 6,389,183 B1
(45) Date of Patent: May 14, 2002

(54) CONTACT IMAGE SENSOR HAND-HELD SCANNER

(75) Inventor: Loi Han, Alhambra, CA (US)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 09/317,550

(22) Filed: May 24, 1999

Related U.S. Application Data

(62) Division of application No. 08/843,662, filed on Apr. 10, 1997, now Pat. No. 5,907,413.

(51) Int. Cl.[7] .................................................. G06K 9/22
(52) U.S. Cl. ........................ 382/313; 382/315; 382/314; 358/474; 358/497
(58) Field of Search .................................. 382/313, 315, 382/312; 358/421, 474, 473, 497, 498; 399/2, 118, 215, 218; 434/116

(56) References Cited

U.S. PATENT DOCUMENTS 5,299,013 A    3/1994  Wang et al.

OTHER PUBLICATIONS

CMOS image sensors: Eclipsing CCDs in visual information?, Stephen Kempainen, EDN Access, Oct. 9, 1997.
A Novel Contact Image Sensor (CIS) Module For Compact And Lightweight Full–Page Scanner Applications, a pre–publication paper presented at IS&G/SPIE 1993 International Symposium, Feb. 4, 1993.

Primary Examiner—Phuoc Tran
(74) Attorney, Agent, or Firm—Small Larkin, LLP

(57) ABSTRACT

A flat bed scanner of the type commonly used as a stand-alone computer peripheral in combination with a contact image sensor module, which extends the full width of the scanner area to provide a 1:1 scanning ratio using a rod lens to focus the image onto the image sensors, with or without a motor driven feed mechanism and which can scan the entire width of a standard sheet of paper in a single pass.

6 Claims, 7 Drawing Sheets

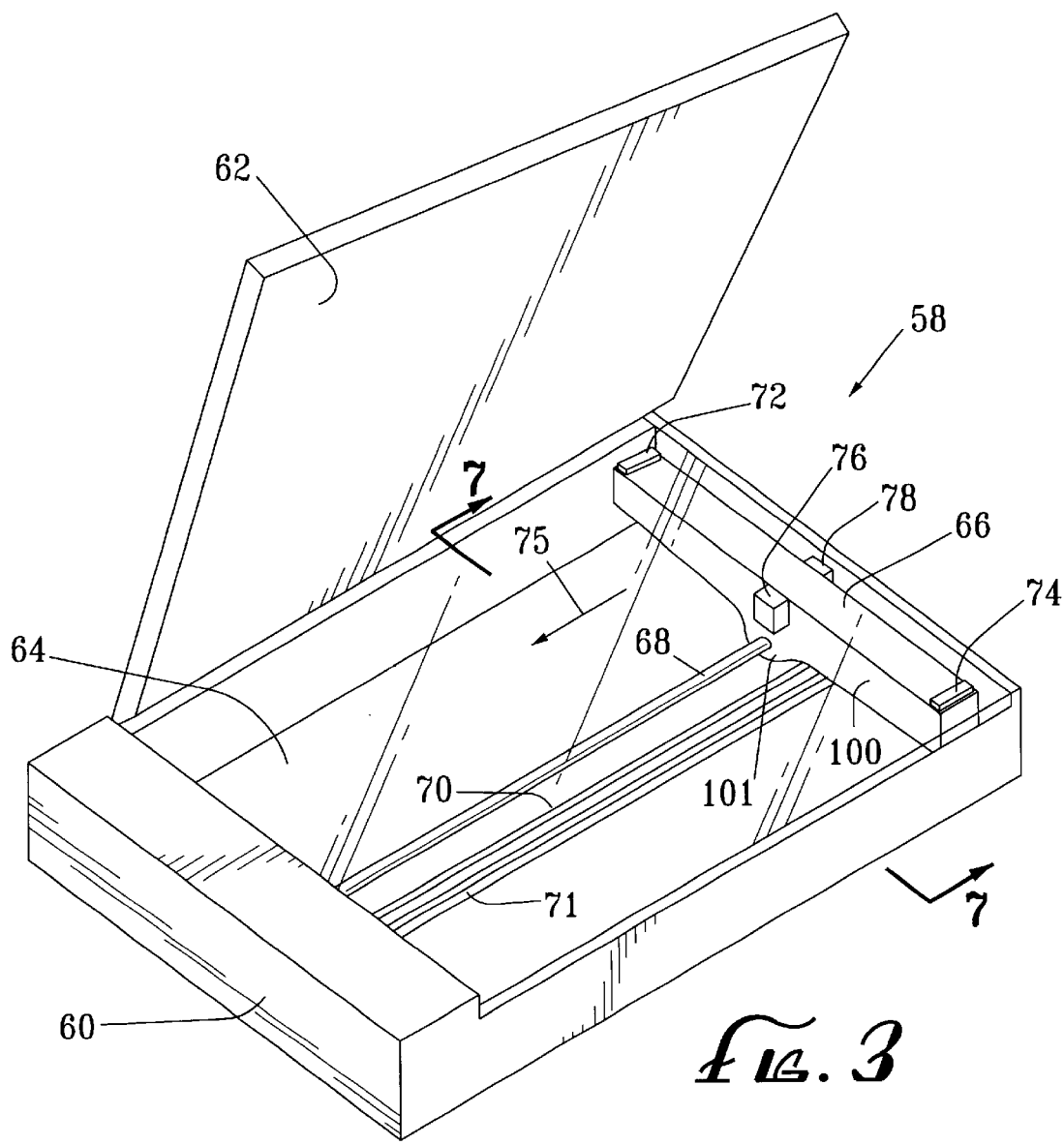
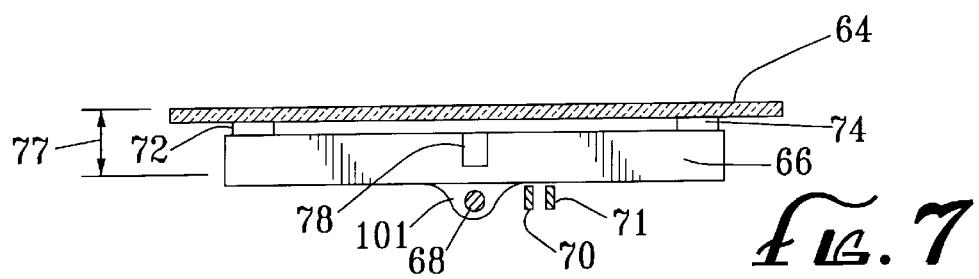

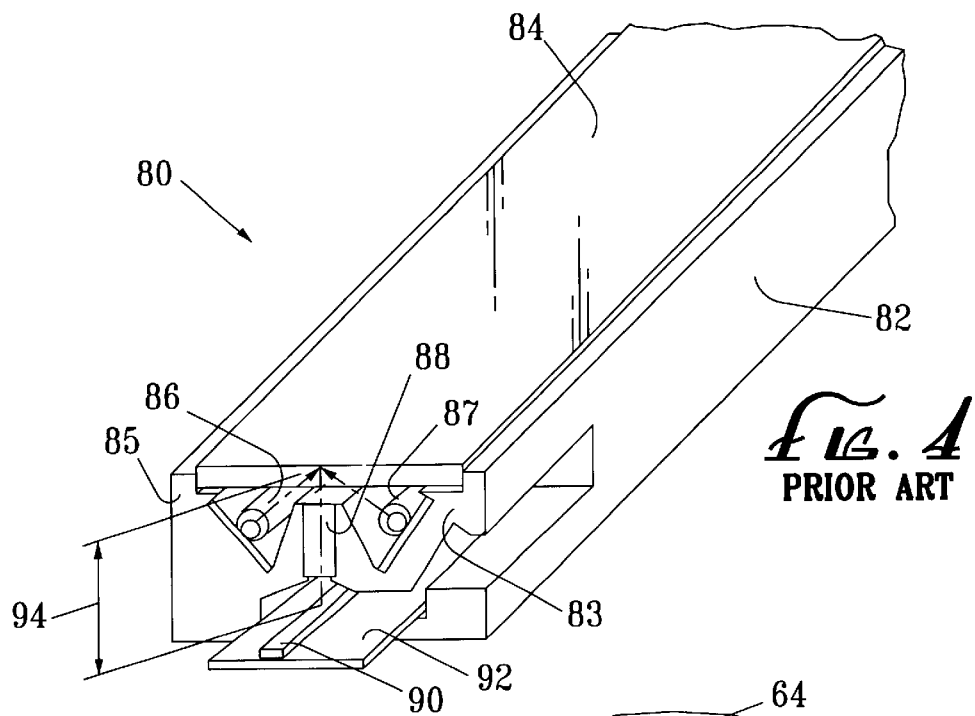
fig. 4
PRIOR ART
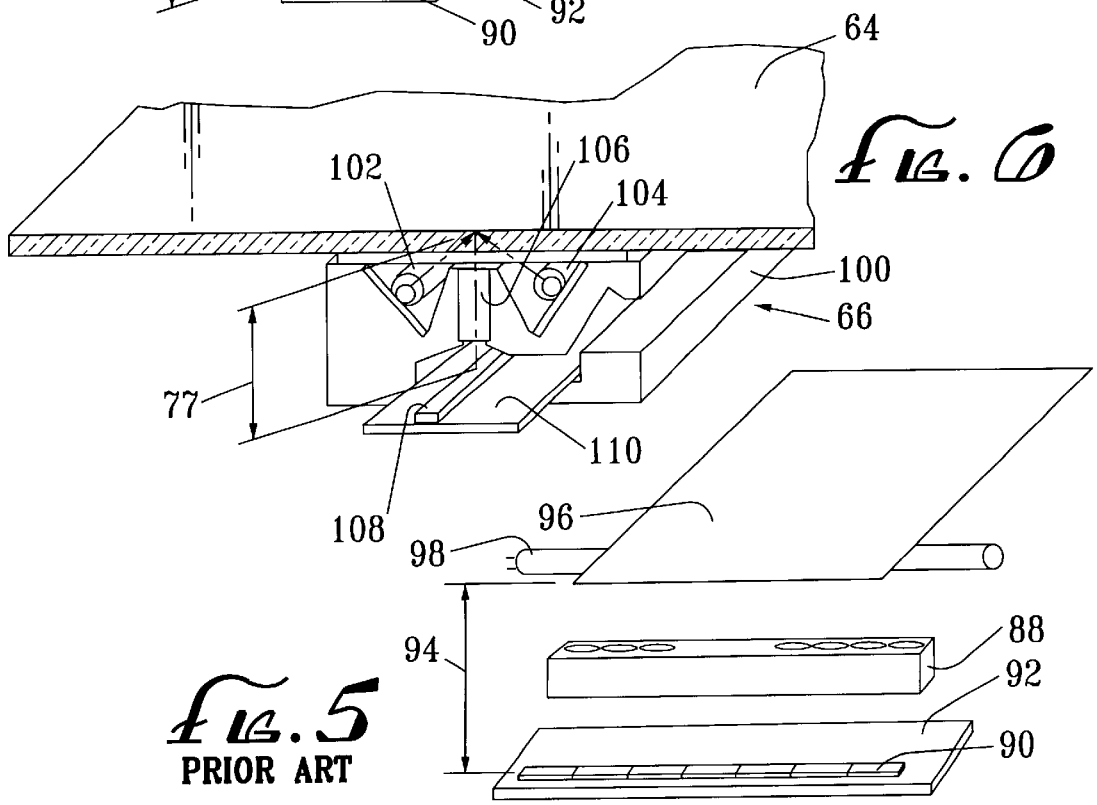
fig. 6
fig. 5
PRIOR ART

CONTACT IMAGE SENSOR HAND-HELD SCANNER

This is a divisional of application Ser. No. 08/843,662 filed Apr. 10, 1997, now U.S. Pat. No. 5,907,413.

BACKGROUND OF THE INVENTION

A. Field of the Invention

The present invention is directed to a stand-alone flat bed scanner or hand-held scanner and which incorporates a contact image sensor (CIS) module.

B. Description of the Prior Art

CIS modules and monorail carriages are known; however their use heretofore has been limited to flat bed scanners of the photocopier or facsimile type, as described in U.S. Pat. Nos. 4,957,689 and 5,610,731. Additionally, specific carriage arrangements for CIS modules are known, such as described in U.S. Pat. Nos. 5,528,410; 5,579,128 for scanners which are unidentified in those documents but which are believed to be directed to scanners in which the document rather than the sensor module is moved, i.e., scanners of the type described in U.S. Pat. No. 5,489,995.

U.S. Pat. No. 4,793,812 describes a hand-held scanner with a rod, or "Selfoc" lens and CCD array and U.S. Pat. No. 5,258,858 describes a linear sensor array in a variety of scanner types. Contact-image sensors per se, are known, such as described in the U.S. Pat. No. 4,939,591.

OBJECTS AND SUMMARY OF THE INVENTION

It is an object of the invention to provide a scanner that employs a contact-image module, the glass cover of which is removed and the module placed under the glass surface of a flat bed scanner of the type commonly used as a stand-alone computer peripheral.

It is a further object of the present invention to provide a contact image sensor module for flat bed scanner used a stand-alone computer peripheral and which extends the full width of the scanning area to provide a 1:1 scanning ratio, using a rod or Selfoc lens to focus the image onto the image sensors.

It is also an object of the present invention to provide a flat bed scanner of the type commonly used as a stand-alone computer peripheral in combination with a contact image sensor module and a scanner carriage that can be in the form of a monorail with low friction strips used to prevent tipping of the module into the glass.

It is a further object of the present invention to provide a flat bed scanner of the type commonly used as a stand-alone computer peripheral in combination with a contact image sensor module and paper sensors to control the beginning and the end of the scanning.

It is a further object of the present invention to provide a flat bed scanner of the type commonly used as a stand-alone computer peripheral in combination with a contact image sensor module and paper sensors to show as to accomplish scanning in two directions, thus saving the need for carriage return prior to the next scan.

It is a further object of the present invention to provide a hand-held scanner of the type commonly used as a stand-alone computer peripheral in combination with a contact image sensor module either with, or with a motor driven feed mechanism and which can scan the entire width of a standard sheet of paper in a single pass.

With reference to the above-described objects, the present invention provides a flat bed scanner commonly used as a stand-alone computer peripheral in combination with a contact image sensor module that extends the full width of the scanning area to provide a 1:1 scanning ratio using a rod or "Selfoc" lens to focus the image onto the image sensor, that the scanner carriage can be in the form of a monorail with low friction strips used to prevent tipping of the module into the glass that the scanner employs a contact image sensor module, the glass cover which is removed and the module placed under the glass surface of the scanner, and that the scanner can include paper sensors to control the beginning and end of the scanning. Also, scanning can be accomplished in two directions so as to save the need for carriage return prior to the next scan. Finally, the present invention provides for a hand-held scanner of the type commonly used as a stand-alone computer peripheral in combination with a contact image sensor module either with or without a motor driven feed mechanism and which hand-held CIS scanner can scan the entire width of a standard size sheet of paper in a single pass.

BRIEF DESCRIPTION OF THE DRAWINGS

FIG. 3 is a perspective view of a preferred embodiment of the contact image sensor flat bed scanner of the present invention.

FIG. 4 is a is a perspective view of a conventional contact image sensor module of the type used in the present invention.

FIG. 5 is an exploded view of the components of a contact image sensor scanner as adapted for use in a facsimile transmission application or a photocopy application.

FIG. 6 is a side, perspective view of a contact image sensor unit as modified for use in the flat bed scanner embodiment of FIG. 3.

FIG. 7 is a cross-sectional view of the FIG. 3 embodiment taken through line 7—7.

DESCRIPTION OF THE PREFERRED EMBODIMENTS

Referring to FIGS. 3, 6, 7 and 8 a preferred embodiment of the present invention is disclosed wherein a flat bed scanner of the type used as a stand-alone computer peripheral device has been modified to incorporate a contact image sensor (CIS) module in place of a charge-coupled device (CCD). As will be described in greater detail, such incorporation and modification provides for improvements in clarity of image, simplification of design, and elimination of a significant number of components required in a flat bed scanner using a CCD.

Figure 1:
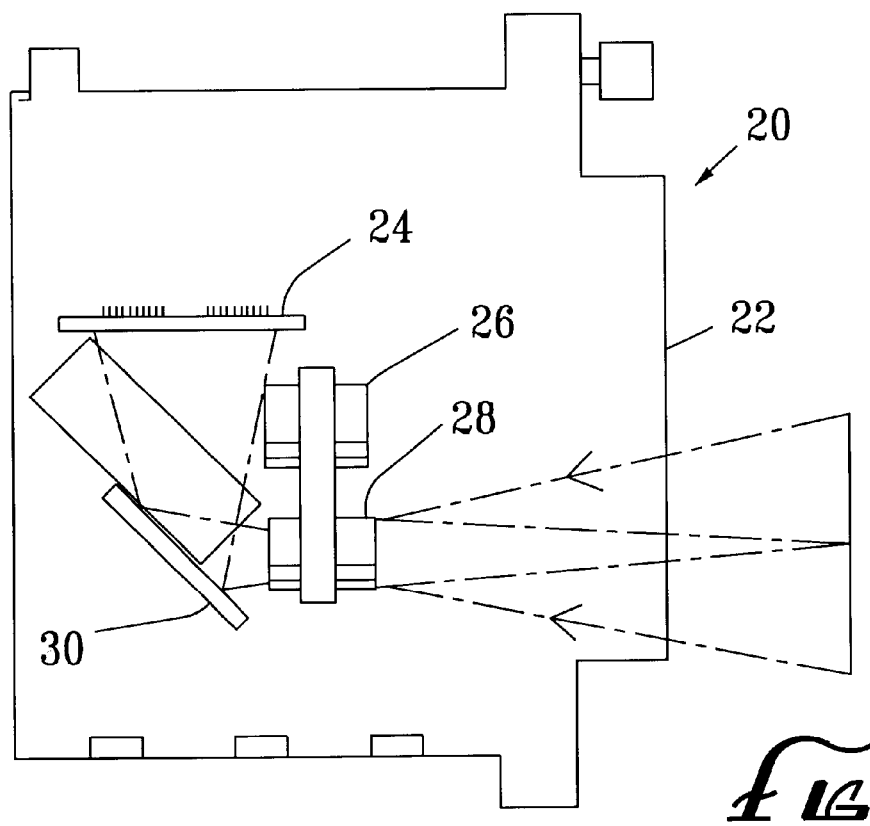
FIG. 1 is a top, partial cross-sectional view of a conventional charge-coupled device flat bed scanner.
Figure 2:
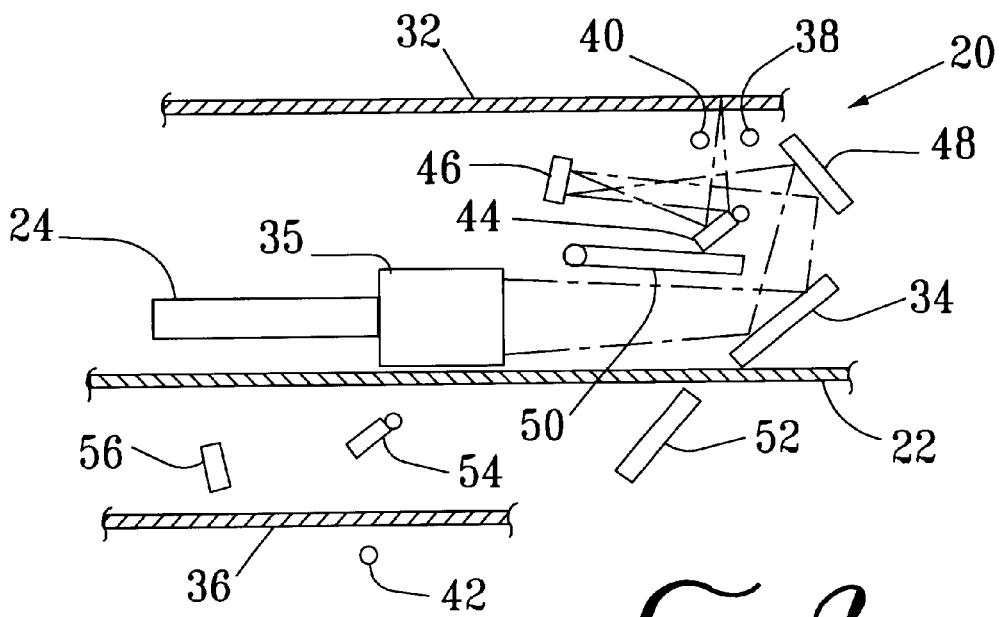
FIG. 2 is a partial, cross-sectional view of a conventional charge-coupled device flat bed scanner.

Referring to FIGS. 1 and 2, partial top and cross-sectional views of a conventional, a flat bed scanner as described in U.S. Pat. No. 5,907,413 "Multi-Resolution Transmissive and Reflective Optical Scanner" incorporated by reference herein is shown having a carriage 22, CCD 24, lenses 26 and 28 and mirror 30. Use of a CCD in a flat bed scanner, such as CCD 24, because of its size, requires incorporation of one or more lenses for the purpose of reducing the image from a conventional size paper of approximately 8.5 inches in width to the width of the CCD of only several inches. Furthermore, when, as illustrated in FIG. 2, the conventional flat bed scanner using a CCD is further modified for use as not only a reflective scanner but also as a transmissive scanner, additional components and complexity necessarily must be incorporated into the design. For example, referring to FIG. 2, the conventional scanner 20 includes a glass platen 32, light sources 38 and 40 and mirrors 44, 46, 48 and 34 for directing the light beam from the reflected image on the platen 32 through one or more of the lenses, schematically illustrated at 35 and then to the CCD 24. When used in a transmissive mode, the object to be scanned is placed on platen 36, with the light source shown at 42. Transmitted light is then reflected in a pathway defined by mirrors 52, 54 and 56 and ultimately through one of the lenses as shown at 35, and then to the CCD 24.

As is readily apparent from the above description, the number of components including not only the lenses and CCD, but also the mirrors and the mechanisms by which the mirrors may be alternated from a reflective scanning mode to a transmissive scanning mode is cumbersome and requires a carriage 22. As is also well known, in order to provide sufficient stability for these components during use, conventional carriages typically are mounted on a dual track system whereby twin rails extend along the length of the housing of the flat bed scanner and provide dual support for the carriage as a motorized driving mechanism moves the carriage from one end of the scanner to the other.

Referring to FIGS. 3, 6, 7 and 8, a preferred embodiment of the present CIS flat bed scanner 58 is illustrated. Scanner 58 includes housing 60, cover 62, glass platen 64 and a modified CIS module 66. As shown in FIG. 3 the CIS flat bed scanner also includes electronic paper or document sensor 76 and 78, monorail 68, first or advance endless belt portion 70, second, or return endless belt portion 71, left buffer, or stabilization pad 72 and right buffer, or stabilization pad 74.

The CIS module used in the present invention is a CIS module used to generate digital signals for use by fax machines and photocopiers, as is known, and modified as herein described to provide a means to generate digital signals for use by personal computers.

Referring to FIGS. 4 and 5, views of a conventional CIS module is shown. The CIS module is the type as described in a prepublication presented at the IS&T-SPIE 1993 International Symposium on electronic imaging: Science & Technology, San Jose, Calif., Feb. 4, 1993. The conventional CIS module 80 includes an aluminum case or housing 82, a flat glass surface 84, and two LED light sources with cylindrical lenses 86 and 87 respectively. The module 80 also includes a rod lens 88, a sensor chip 90 and a ceramic substrate 92. The distance between the top of the flat glass 84 and the sensor chip 90 is represented with double headed arrow 94, and, typically is a distance of about 2.0 cm. Shown in FIG. 5 is a schematic representation of the CIS module in use in, for example, a facsimile transmission application wherein the original document 96 is lit with light source 98 and a reflected beam of light passes through the individual channels of rod lens 88 which functions as a collimator to focus the reflected light onto a plurality of sensor chip elements 90 positioned on the ceramic substrate 92. Because the rod lens 88 functions as a collimator, there is no magnification or reduction of the image from the original document; rather, the CIS module provides for 1:1 optics onto the image sensors 90. Various types of CIS modules are available in various sizes. Referring to FIG. 3, and more particularly to FIG. 6, the modified CIS module of the present invention includes a casing 100, a left LED light source with cylindrical lens 102 and a right LED light source with cylindrical lens 104, both focused so that light is directed to a point just above the individual focusing elements on rod lens 106. Positioned underneath the rod lens 106 is the sensor chip 108 which in turn is affixed to the top surface of ceramic substrate 110.

As shown in FIG. 6, the CIS module does not include a flat glass portion which is shown as an insert 84 in FIG. 4. Rather, the module 66 has been modified so as to remove a portion of the aluminum housing that provides a channel in which the flat glass 84 otherwise would be positioned. The portion of the housing removed is illustrated at regions 83 and 85 on FIG. 4 with a glass portion 84 and aluminum portions 83 and 85 removed, or modified CIS module may then be positioned under the glass platen 64 so as to provide the appropriate distance between the top surface of the glass platen 64 and the sensor chips 108. As shown in FIG. 6, this distance is between the double arrow head line 77 and the thickness of the glass, remaining height of the CIS module and space allowed for an intervening sliding surfaces or buffers 72 and 74 is equal to about 2.0 cm. In other words, the CIS module and the flat bed scanner platen subassembly is modified so as to provide the same distance between the top surface of the glass platen and the sensor chip as was the distance between the top surface of the flat glass portion of the conventional scanner and its sensor chip.

With reference to FIGS. 3 and 7, the monorail transport capability and the slides or buffers 72 and 74 will be described. In conventional flat bed scanners using a CCD as the device which converts the visual image into a series of digital signals, a cumbersome set of components is required including lenses, a carriage and a dual rod transport system for moving the carriage from one end of the scanner to the other. By incorporation of a modified CIS module into a flat bed scanner, the 1:1 optics provided by the CIS module eliminates the need for many of the components required in a conventional flat bed scanner, such as the dual track and carriage. As shown in FIGS. 3 and 7, the modified CIS module may be mounted on a single, or monorail 68 and may be transported from one end of the scanner to another through use of an endless belt, one portion of which is illustrated at 70 and the other portion of which is illustrated at 71. The CIS module casing 100 includes a portion or region 101, shown in FIGS. 3 and 7 which extends under the module and provides for a bore, or channel through which the monorail 68 may pass.

In order to provide a smooth, uniform and nonsticky bearing surface between the top of the CIS module 66 and the bottom of the glass platen 64 as well as to function as a rotation prevention structure, bearing surfaces, strips or buffers 72 and 74 are placed at the outer, upper surfaces of the modified CIS module. As presently envisioned, these surfaces may be a strip of Teflon® tape which may be wound around the entire CIS module, or may simply be taped on the top, outer surface of the module, with an overlap at the forward and trailing edge of the module, with reference to the direction arrow 75 as shown in FIG. 3. The Teflon® material is preferred because of its slippery, nonstick surface. As is readily apparent, in the absence of such buffers 72, 74, and within the range of manufacturing and/or design tolerances, the modified CIS module 66 may tend to rotate in one direction or the other, in the absence of some structure which would prevent rotation. While conventional structures might be incorporated into the CIS module at the bore through which the monorail 68 extends, the preferred structure for preventing rotation is the buffers or bearing surfaces 72 and 74. Also, as shown in FIG. 7, the combined thickness of the glass platen 64 bearing surfaces 72 or 74 and modified CIS module 66 is such that the height 77 is equal to the distance between the top surface of the flat glass and the sensor chip of the conventional CIS device, typically 2.0 cm.

Figure 8:
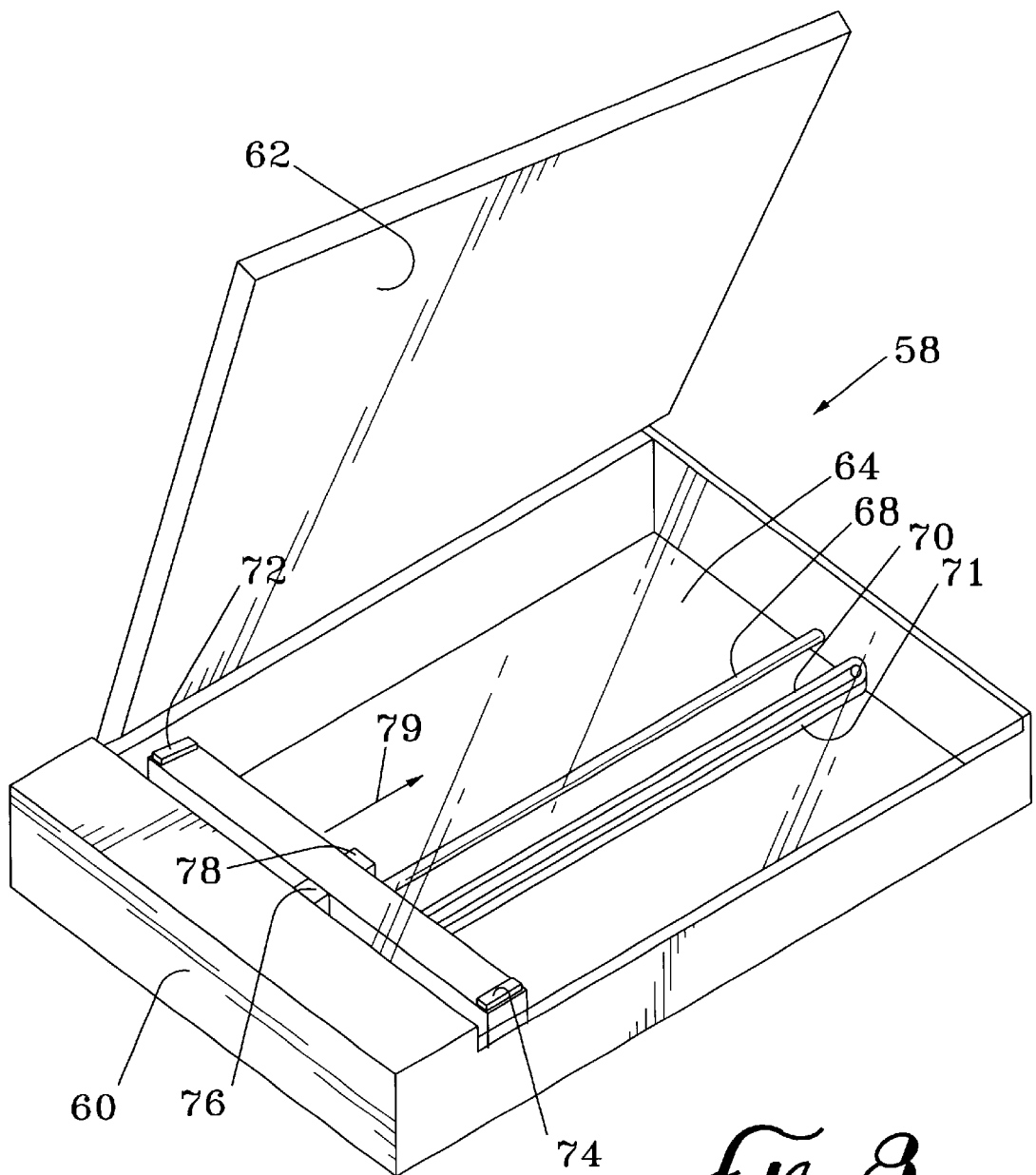
FIG. 8 is a perspective view of the FIG. 3 embodiment, illustrating the contact image sensor module positioned at the opposite end of the flat bed scanner as compared to FIG. 1.
Figure 13:
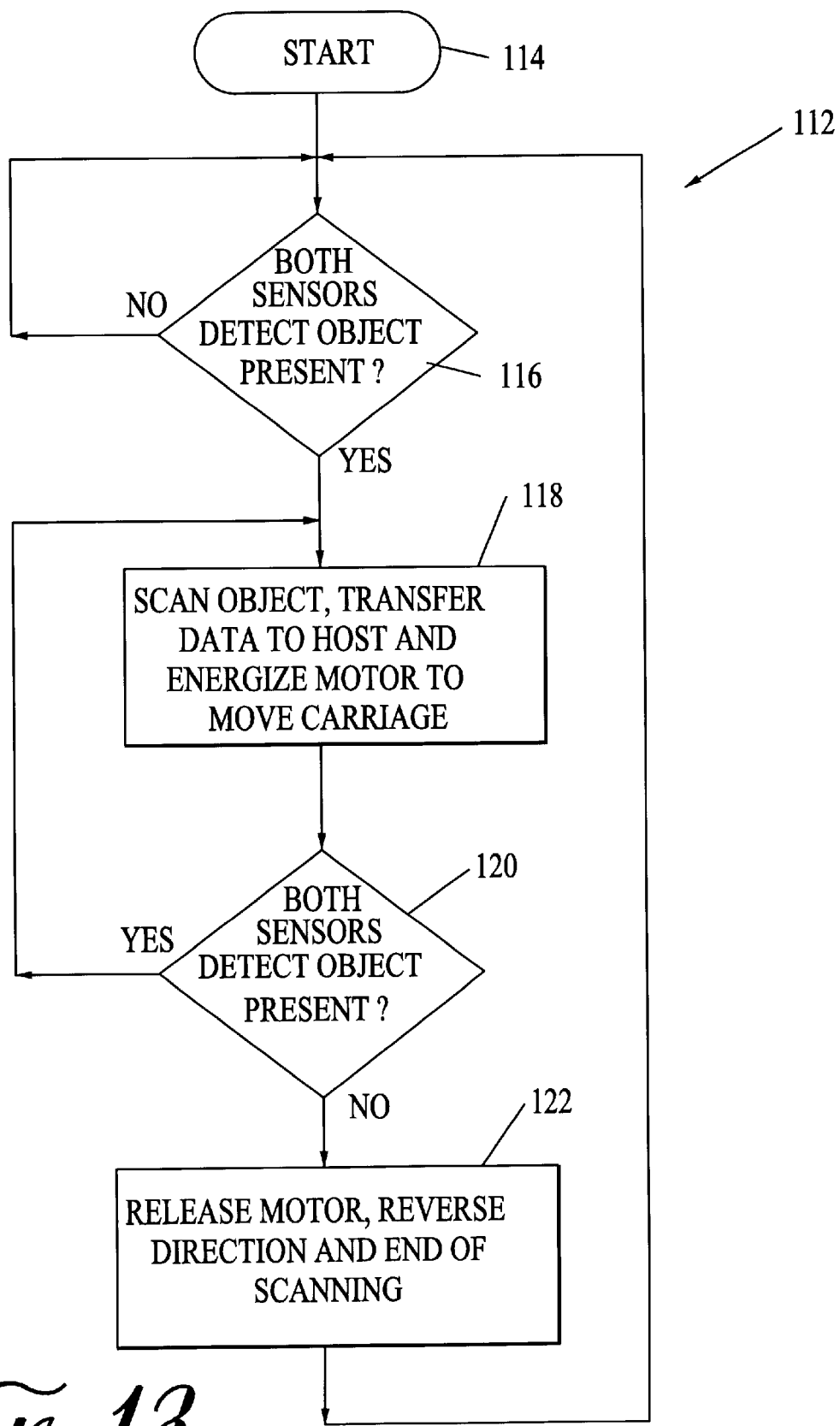
FIG. 13 is a flow chart illustrating the functional steps associated with use of the document sensors of the present invention.

Another advantage of the present invention, due to the simplicity of the objects of the modified CIS module, scanning of a document may take place in both the forward and reverse directions, with the forward direction being defined as the direction shown with arrow 75 in FIG. 3 and the reverse direction as shown with arrow 79 in FIG. 8. Referring to FIG. 3, first electronic paper sensor 76 is mounted in a fashion on the first, or leading edge of the modified CIS module 66 and, electronic paper sensor 78 is mounted on the trailing or second side of the modified CIS module 66. The electronic paper sensors, per se, are conventional, and their method of attachment to a surface, per se, is conventional. The use of a single such sensor with a CCD image sensor in a flat bed scanner is described in U.S. Pat. No. 5,929,435, "Apparatus and Method For Automatically Detecting and Reading Graphic Matter", which is incorporated herein by reference. With reference to FIG. 13, a flow chart illustrating the functions of the microcontroller for scanning in both the forward direction, i.e., the direction of arrow 75 in FIG. 3, as well as in the reverse direction, i.e., the direction of arrow 79 of FIG. 8, will be explained. With the flat bed scanner 58 in the position as shown in FIG. 3, the scanning function start 114 shown in FIG. 13, begins scanning and movement of the modified CIS module along monorail 68 through operation of conventional stepper motor and gears through operation of a microcontroller, not shown, to cause movement of the endless belt 70–71 as shown. Upon movement of the CIS module 66 in direction of 79 scanning does not take place until both the first sensor 76 and the second sensor 78 detect the object present at step 116. When, as shown in FIG. 3, both the leading sensor 76 and trailing sensor 78 detect the presence of the object to be scanned, then scanning begins visual information is converted to electronic data and transferred to the host computer and the motor continues to move the CIS module carriage in the direction of arrow 78 at step 118. The motor remains energized to move the carriage or CIS module 66 in the direction of arrow 75 as long as both sensors continue to detect the presence of the object. When, as shown at step 120 one of the sensors no longer detects the presence of the object, the motor is released or stopped, the direction of movement is reversed and scanning is stopped at step 122. With reference to FIG. 3, this situation occurs when, the leading or first scanner 76 reaches and passes beyond the edge of the paper.

With respect to FIG. 8 shown in the configuration where scanning in the direction of arrow 75 has just been completed, the scanning function in the reverse direction will be explained. In this configuration, with another sheet of paper or other object to be scanned, placed on the scanner, as it is configured in FIG. 8, the motor direction has been reversed, scanning has been stopped and the scanner is ready to begin another cycle with the start function as set forth on FIG. 13 at 114. Once started, the motor is engaged to cause endless belt portion 70 and 71 to move the scanner in the direction of arrow 79 and first sensor 76 in this reverse scanning becomes then the trailing detector and second electronic paper electronic detector 78 becomes the leading detector. As the carriage or modified CIS module 66 moves in the direction of arrow 79 and both sensor 76 and 78 detect the presence of the object, step 116, scanning begins, and continues until one of the scanners no longer detects the presence of the object. With respect to the FIG. 8 direction of scanning, this will occur as the second detector 78 now the leading detector, reaches and passes the edge of the object to be scanned, and as is set forth in step 120 causes a release of the motor, reverse direction of the motor and end of the scanning function whereby the scanner is returned to the configuration as shown in FIG. 3.

Figure 9:
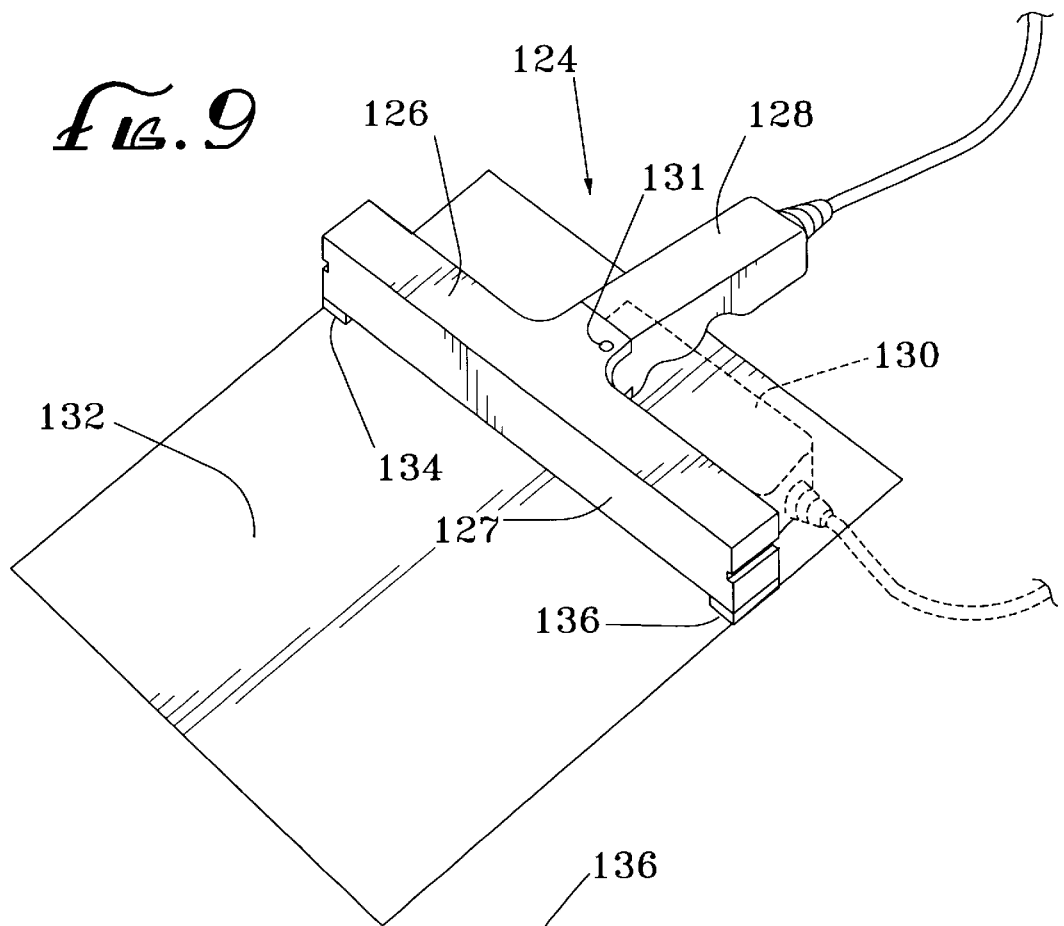
FIG. 9 is a perspective view of an alternate embodiment of the present invention wherein a contact image sensor module has been modified and incorporated into a hand-held scanner.
Figure 10:
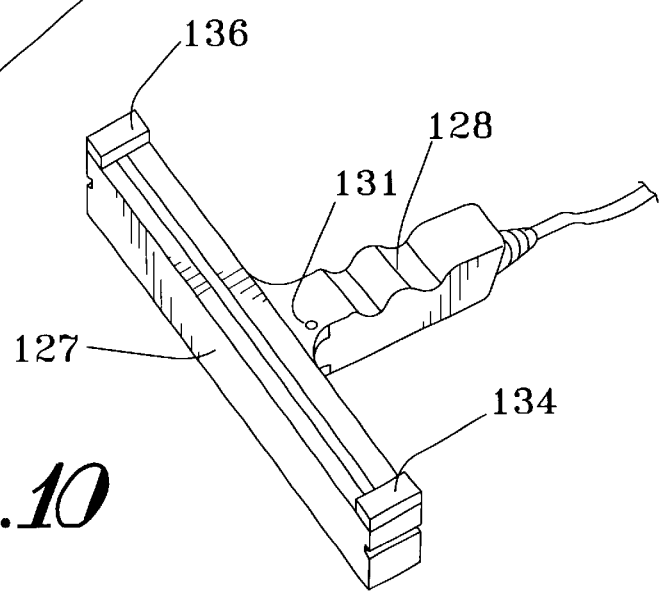
FIG. 10 is a bottom, perspective view of the hand-held scanner embodiment of FIG. 9.

Referring to FIGS. 9 and 10, an alternate embodiment of the present invention is illustrated in which a CIS module has been modified to be incorporated into a hand-held scanner 124. The hand-held CIS scanner 124 includes a modified CIS module 126 with a housing 127, a handle 128 and offers bearing surfaces 134 and 136. The handle 128, in which the control circuitry is incorporated, is mounted on the CIS module in a conventional pivoting manner through pivot 131. The handle 128 is shown in a folded or pivoted position 130 in dashed lines. The hand-held scanner 124 is also shown in FIG. 9 as having a width equal to the width of an object to be scanned, such as, a preferred embodiment, 8.5 inches in width so that the active scanning region between the buffers 134 and 136 is long or wide enough to scan the entire width of a typical 8.5×11 sheet of paper in a single pass. The housing 127 of the CIS module modified for the hand-held scanner is modified in length so that the total distance between the surface of the buffers 134 and 136 that touch the document 132 to the sensor chip in the CIS module not shown in FIGS. 9 and 10, is equal to the distance between the top of the flat glass of the CIS module to the sensor chip. Alternatively, in the hand-held CIS scanner, the conventional CIS module may be modified to include a handle and appropriate control circuitry, but without the buffers 134 or 136. Rather, the CIS module adapted for hand-held application may be used with the conventional case 82 and flat glass 84 as described above with FIG. 4, but in which the case is adapted for use with the handle 128 as shown in FIGS. 9 and 10.

Figure 11:
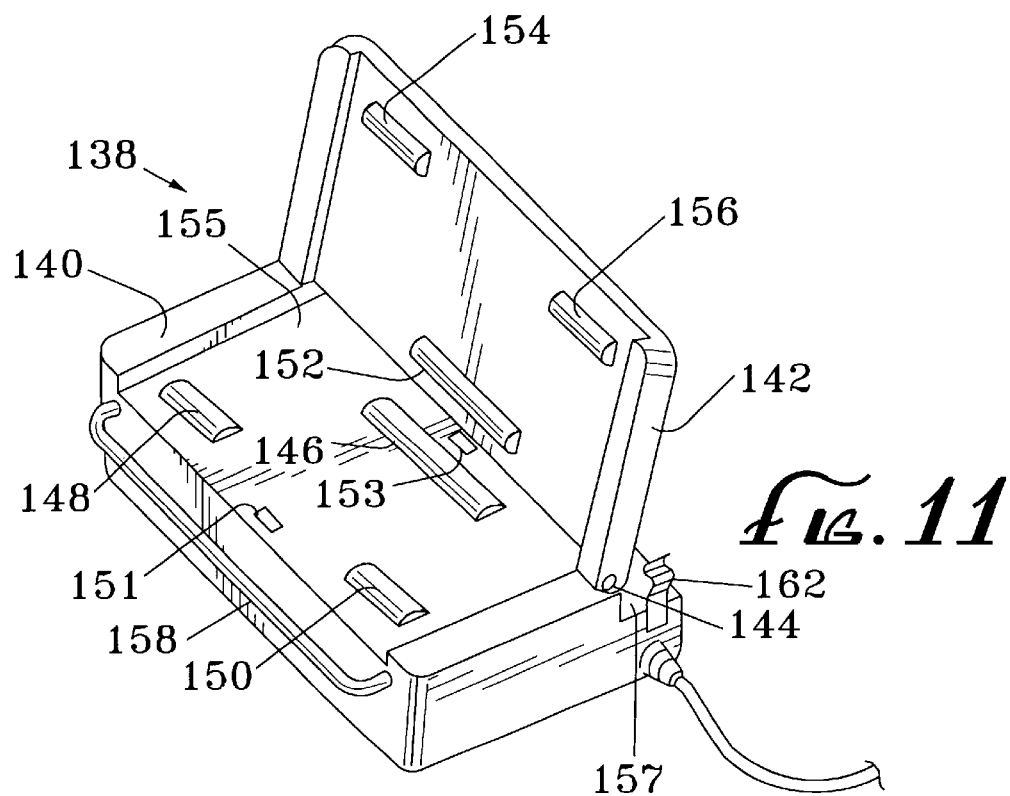
FIG. 11 is a top perspective view of a motorized document feeder module adapted for use with the hand-held scanner embodiment of FIG. 9.
Figure 12:
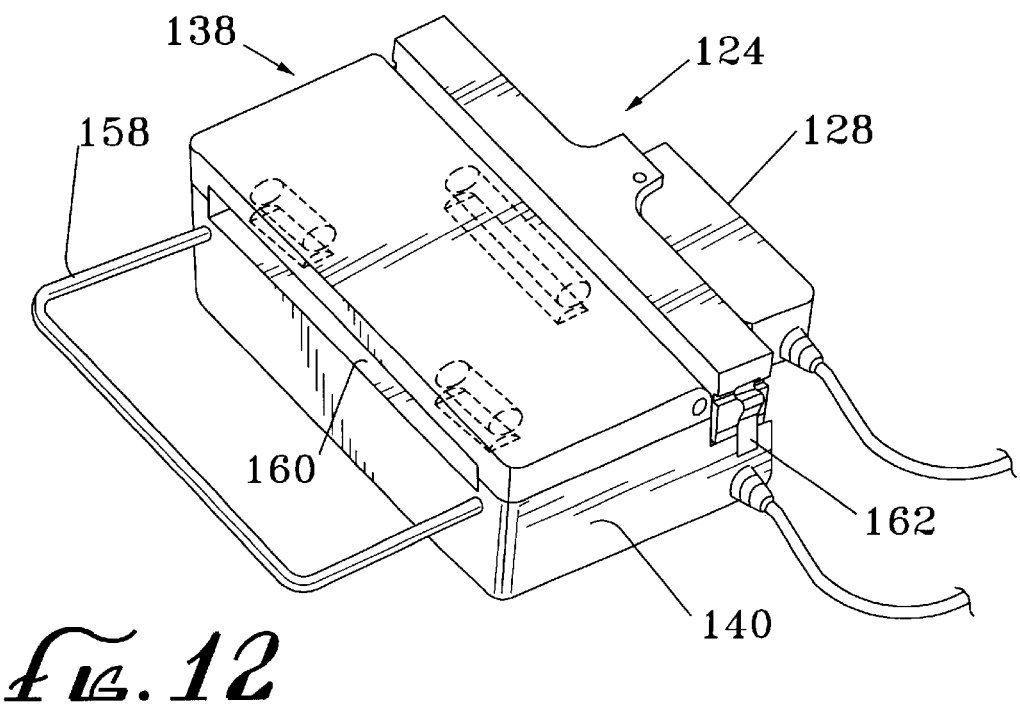
FIG. 12 is a top perspective view of the FIG. 11 motor module and the FIG. 9 hand-held scanner embodiment positioned for operation.

Referring to FIGS. 11 and 12, the present invention is shown in combination with a motorized document feeder mechanism 138. The motorized document feeder is similar to a combined scanner and feeder as described in U.S. Pat. No. 5,472,182. The motorized document feeder 138 includes a housing 140, a lid 142 and a retractable document support 158. Lid 142 pivots about pivot point 144. The housing 138 contains a motor and drive rollers 146, 148 and 150. The motor gearing and control components may be conventional and may be like those used in the combined motorized portable optical scanner and document feeder as described in U.S. Pat. No. 5,472,182. The lid 142 includes driven rollers 152, 154 and 156. With respect to the document feeder 138, the hand-held scanner 124 is positioned and retained on shoulder 157 of the housing by a pair of clips, one of which is shown at 162. Referring to FIG. 12, the hand-held scanner 124 is shown attached to the motorized document feeder 138 and with its handle 128 in a closed position, i.e. rotated 90 degrees to be flush with the back of the hand-held CIS scanner 124. Document support 158 is shown in its extended position in FIG. 12 also, cover 142 is shown in its down position in FIG. 12, with the cover and housing being constructed so as to provide a slot or orifice 160 through which documents or other objects to be scanned may be fed into the document feeder and engaged with the rollers for movement across the surface 155 and past the rod lens of the CIS hand-held scanner. Also shown in FIG. 11 are first electronic document sensor 151 and second electronic document sensor 153 which may be used to start and stop the motor.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. In a stand-alone computer peripheral hand-held scanner including a housing, and a control system, the improvement comprising:
   a contact image sensor module operatively positioned within the housing adapted to convert a visual image into a series of electronic data signals and extending at least 8.5 inches in width.

2. The scanner of claim 1 further including a motor driven paper feed mechanism operatively connected to said scanner.

3. A hand-held computer peripheral scanner for scanning an object in a first scanning direction and in a second scanning direction comprising:
   a casing adapted for use as a hand-held peripheral for personal computers;
   a contact image sensor module having an electronic sensor chip adapted to convert visual images to a series of electronic data signals and a flat surface facing the object to be scanned mounted a first predetermined distance from said chip;
   a first buffer mounted at one end of the flat surface of the sensor module, having a first surface facing the object to be scanned and extending a second predetermined distance from said first surface in the direction of the object to be scanned;
   the first buffer having a first surface facing the object to be scanned; and
   the first predetermined distance is equal to the second predetermined distance.

4. The scanner of claim 3 further including a slippery, non-stick surface on said buffer.

5. The scanner of claim 3 further including:
   a second buffer mounted at an end opposite said one end of the flat surface of the sensor module, having a surface facing the object to be scanned and extending the second predetermined distance in the direction of the object to be scanned.

6. A hand-held computer peripheral scanner for scanning an object comprising:
   a casing including a handle;
   a contact image sensor module adapted to generate digital signals for use by personal computers, the module having a plurality of sensors, rod lenses, cylindrical lenses and a flat glass surface, and adapted to provide a 1:1 scanning ratio of the object to be scanned to the plurality of sensors.

* * * * *